Figure 4:
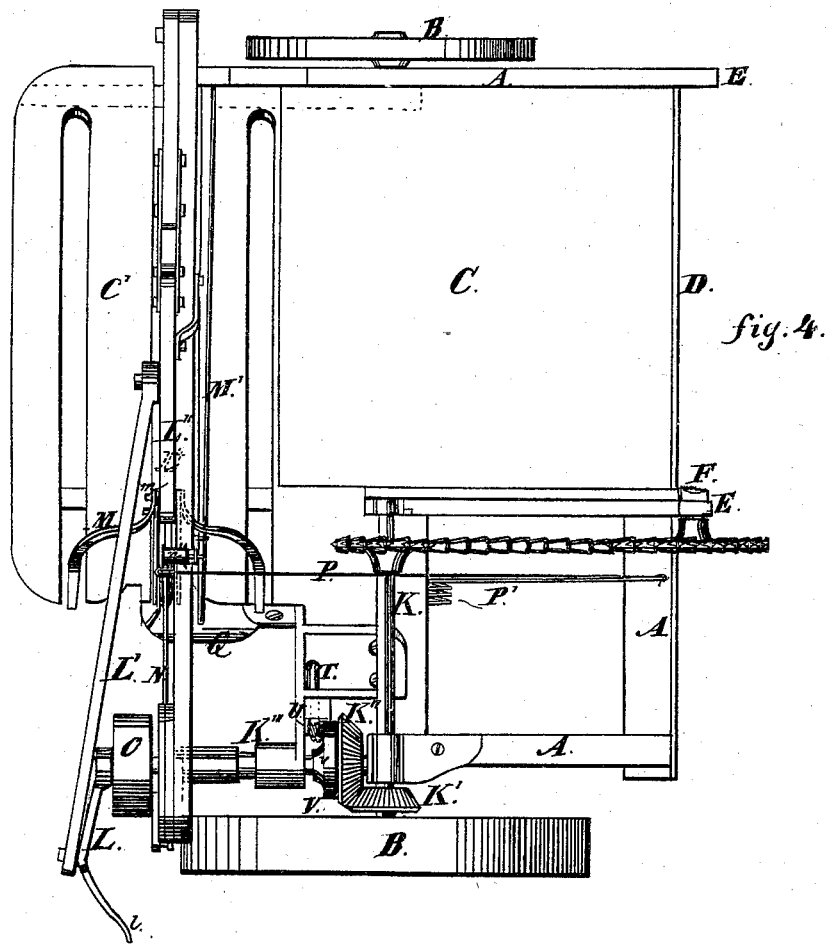

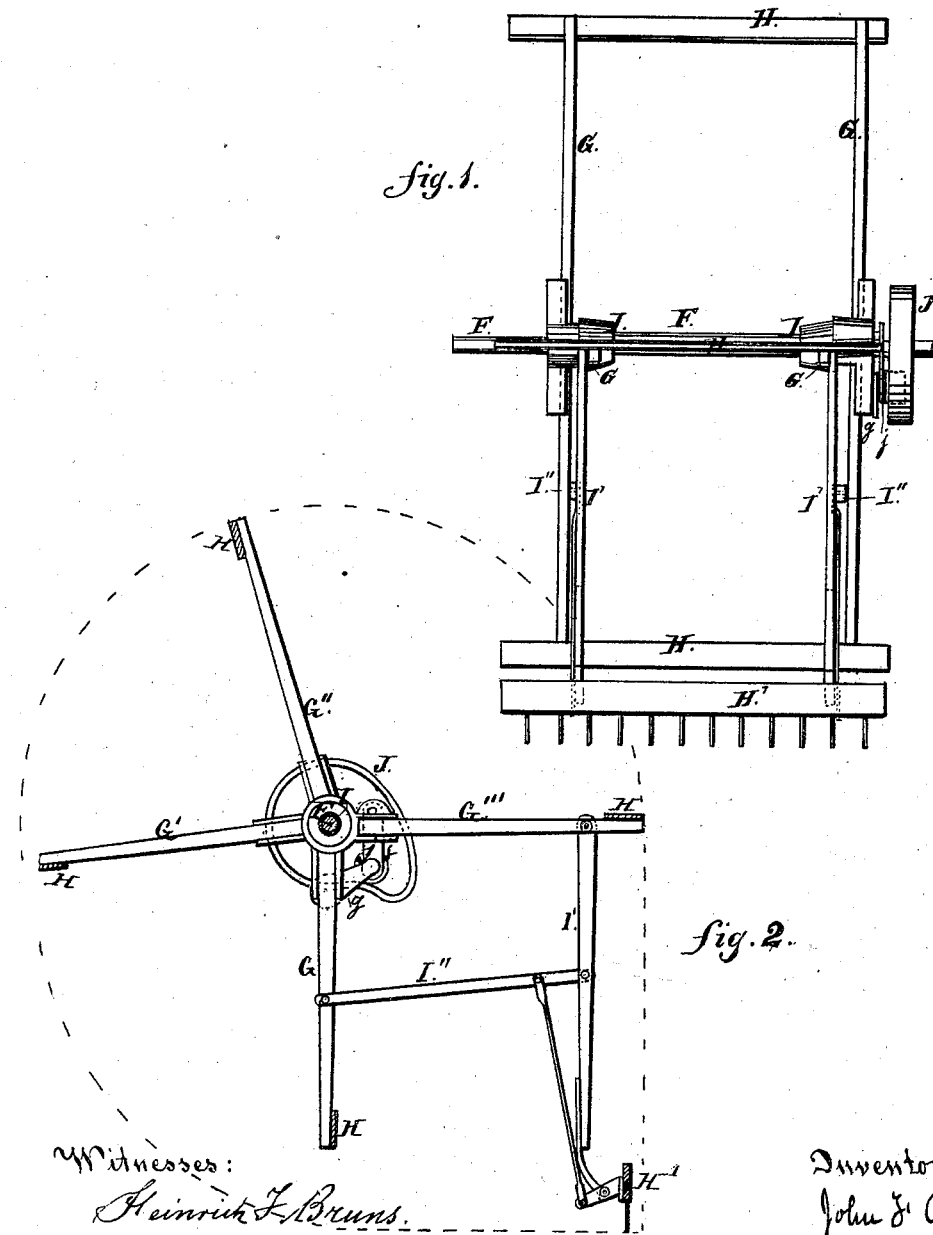

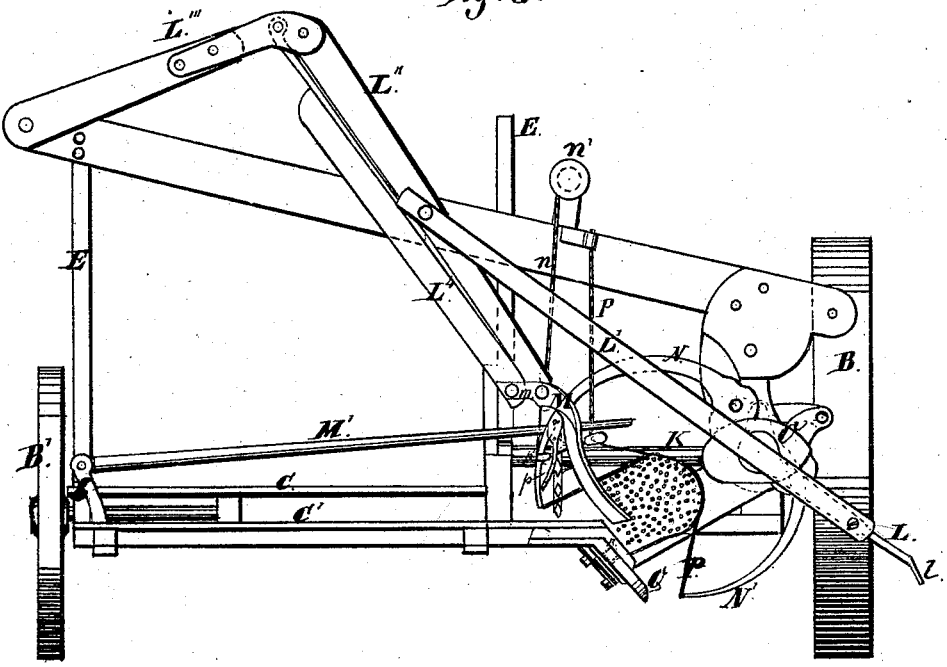

J. F. APPLEBY.
GRAIN-BINDER.

No. 171,465.

4 Sheets—Sheet 3.

Patented Dec. 28, 1875.

Witnesses:
Heinrich F. Bruns.
Edgar F. Griffin.

Inventor:
John F. Appleby
by Coburn & Munday
his attys.

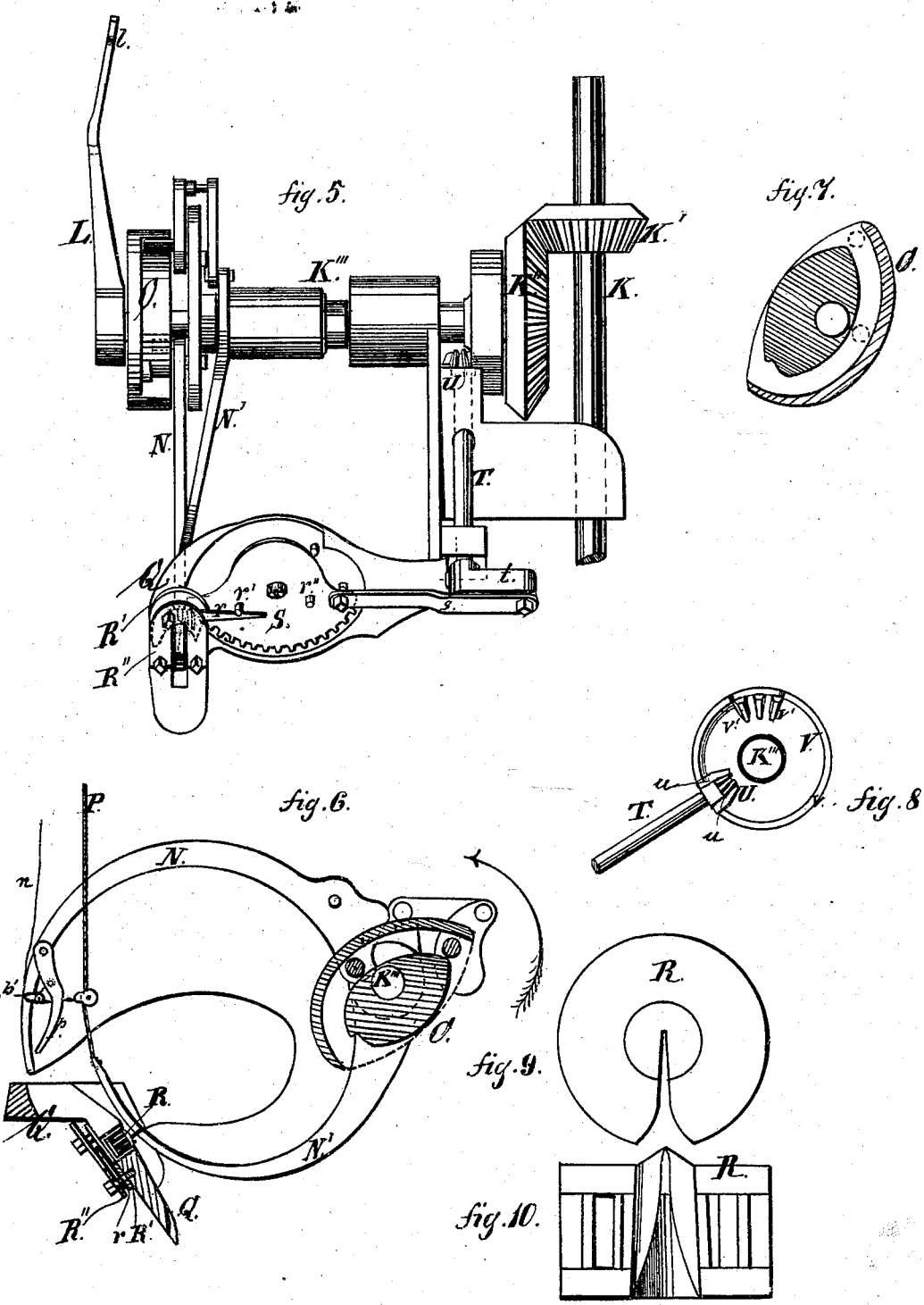

UNITED STATES PATENT OFFICE.

JOHN F. APPLEBY, OF BELOIT, WISCONSIN.

IMPROVEMENT IN GRAIN-BINDERS.

Specification forming part of Letters Patent No. 171,465, dated December 28, 1875; application filed June 13, 1873.

*To all whom it may concern:*

Be it known that I, JOHN F. APPLEBY, of Beloit, in the county of Rock and State of Wisconsin, have invented certain Improvements in Self-Raking and Self-Binding Harvesters, of which the following is a specification:

The first part of this invention relates to the automatic rake and its operating mechanism; and consists in constructing one of the bars of the revolving reel so that it will, after performing the function of a reel-bar, sweep back across the platform, and, being toothed in the manner of a rake-head, perform the office of a rake; and this is accomplished by pivoting one pair of the radial arms of the reel loosely to the reel-shaft by means of a sleeve, to which is attached an arm fitted with a roller, which plays within a cam attached to the reel-standard, so that this pivoted pair of arms is made to move in the circle of the motion of the reel with a varying speed. The rake-head is attached to the end of a pair of arms pivoted to said varying reel-arms, and connected in turn with the next pair of fixed reel-arms by pivoted connections, so that as the reel revolves and brings the rake-head down to the front of the platform, at this point the cam operates to slacken the speed of the varying pair of arms, and the next pair to which the pivoted connections are attached follow along after and push the rake-head back to the rear of the platform, at which point the cam operates in such a way as to cause the varying pair of arms to recover gradually their speed, so that the rake is brought up and carried around to act as one of the beaters or bars of the reel again, all of which will be more fully understood by reference to the drawings, and the explanation hereinafter given.

The second part of this invention relates to the mechanism for moving the grain transversely to the binder after it is discharged from the platform; and consists in an automatic fork moved along an open-work way by means of a peculiar combination of a crank and jointed levers, as will more fully hereinafter appear.

The third part of this invention relates to the mechanism for binding the grain, consisting in several intricate movements and devices for bringing the binding wire around the sheaf, holding the sheaf while being bound, twisting the wire to secure it, cutting it off, and retaining it in position for the succeeding sheaf, all of which will more fully appear in the subsequent description, in which particular reference is made to the drawings, accompanying and forming a part of this specification.

In the said drawings, Figure 1 represents an elevation of the rake and reel separate from the harvester. Fig. 2 is a side view of the same, the dotted lines showing the path of the rake in revolution. Fig. 3 is a rear elevation of the harvester with the rake and reel removed. Fig. 4 is a top or plan view of the same. Fig. 5 represents a view of the actuating mechanism of the binder as seen from below, enlarged from preceding figures. Fig. 6 is a view of the sheaf encircling arms and their operating cams. Fig. 7 is a sectional projection of the same cam to show its position in Fig. 5. Fig. 8 is a view detached of the intermittent gear. Figs. 9 and 10 are, respectively, a top and side view of the pinion through which the binding-wire passes.

In the said drawings, A represents the frame-work of the harvester. B is the traction-wheel, and B' a supporting-wheel. C is the platform at the rear of the sickle-bar D. E are the standards to support the reel. F is the reel-shaft, to which are affixed rigidly the arms G G' G'', carying beaters H. A loose sleeve, I, upon the reel-shaft carries arms G''', to which is attached the rake-head H' by means of the bars or connections I', which connections in turn are connected by the bars I'' to the arms G. A cam, J, is affixed to the standard E. This cam is supplied with a roller, pivoted to the rigid arm *j*, connected to the adjacent arm G''' upon the sleeve. An arm or connection, *g*, passes from the roller to the adjacent arm G. The operation of this cam is as follows: The roller follows the cam in the revolution of the reel, and causes the rake to pass squarely back over the platform. This is accomplished by its retarding the revolution of the arms G''', while the revolution of the arms G continues at the same speed. This motion of the arms G pushes through the connections I″, the rods I′, and elongates the parallelogram, consisting of the arms G G‴ and rods I′ I″. The rake, being at one of the angles, is moved back in a straight line until it reaches the back of the platform. At this point the cam commences to increase the proportionate speed of the arms G‴, whereby the rake is picked up and drawn back into the circle of the beaters, and, as the rake-head comes around with the beaters, serves itself as a beater. At the rear of the main platform C is a subsidiary platform, C′, placed a little lower than the main platform, and running at right angles to it. K is the driving-shaft, which revolves with the traction-wheel, and is fitted with a miter gear-wheel, K′, which meshes into a miter gear-wheel, K″, upon the shaft K‴, to the extreme outer end of which latter shaft is connected a crank, L, which operates a pitman, L′, attached to the fork-handle L″, which is attached to the frame of the harvester by a pivoted connection, L‴. M is the fork or subsidiary rake, pivoted to the handle L″, and, by the short arm m, pivoted to the pivoted connection L$^{iv}$.

By the revolution of the crank the fork is carried back and forth across the subsidiary platform to deliver the grain to the binder. The motion of the pitman is peculiarly adapted to this work, as its speed varies as the crank is turning the dead-centers, gradually slackening as it nears the end of the stroke.

By reason of the short arm m and connection L$^{iv}$ the fork is always kept in nearly a vertical position, as will be readily understood.

The handle L″ is connected by a pivoted bar, L‴, to the frame of the harvester, so that the motion of the fork is in a right line, and is caused by these various pivotings to move straight across the platform when operated by the pitman.

The tines of the fork M pass through apertures or slits in the platform upon which it operates, so as to gather more readily all the grain. To one of the tines of the fork is affixed a ring, which encompasses the pole M$^1$, pivoted at the rear of the platform C′, so that the motion of the fork back and forth causes the pole to rise and lower. The purpose of this pole is to compress the grain as it is being gathered into a bundle by the fork, and being carried to the binder.

The binding mechanism consists of a cam-operated guide-arm, N, through the nose of which the binding-wire n passes from the spool n$^1$, upon which it is wound and held by a tension device. The binding-wire, after passing through the nose of the arm N, passes down to a point below the platform, and is secured in a manner presently explained, so that the wire stands vertically in the path of the grain as it is pushed from the subsidiary platform. The pressure of the bundle unwinds the wire sufficiently, so that slack enough is given to form a bight, in which the bundle is contained when the arm N comes down, bringing a second bight of the wire with it, so that the bundle is surrounded by a single wire, both ends of which are pressed into a slit in a half-revolving pinion, which twists the two ends and cuts the bundle loose to allow it to fall bound upon the ground, and at the same time secures the wire at the pinion.

The arm N is operated by the cam O upon the shaft K‴, and is so timed as to descend at the moment the bundle arrives at the place of binding, and to remain down while the pinion twists the wire. A pivoted finger, p, upon the arm N serves to press one portion of the wire into the notch of the pinion while the nose of the arm presses the other—that is to say, the nose and finger take opposite sides of the notched pinion in their descent, straddling it, so as to insure the wire being placed properly in the notch. This operation is distinctly shown at Fig. 6 of the drawing.

To prevent the finger p from becoming entangled with the grain at the descent of the arm N, it is kept closed upon said arm by a miniature block and tackle, p′, operated by the cord P, connected at one end to a spring, P′, and at the other to the arm N′, which is similar to the arm N, and actuated by the same cam, but moves oppositely to the arm N and at a different timing. To this arm at its nose is attached the cord P, so that said cord is withdrawn from the path of the bundle after it is bound to allow it to fall clear.

An iron frame-work, Q, contains the notched pinion R. This notched pinion is engaged by a cogged segment, S, fitted with a wrist-pin, to which is attached a connection, s, extending to the crank t upon the shaft T. Upon the other end of this shaft is a peculiar mitered pinion, U, having six teeth, and made of the form shown at Fig. 8. Two of the teeth upon opposite sides of this pinion are cut partially away, to form flanges u, one of which flanges, when the pinion is in proper position, rests against the flange v of the wheel V carried upon the shaft K‴. This wheel V has upon its face, and within the flange v, three teeth, v′, and the flange v is cut away at this point. The wheel V is revolved by shaft K‴, and brings the teeth v′ around to the pinion U, causing said pinion to make a half-revolution, and as soon as the teeth are clear the flange v of wheel V sets under the flange u of the pinion and detains it from further motion until the wheel V brings the teeth round again. This intermittent motion is communicated, through the shaft T, crank t, and connection s, to the cogged segment S, and the wrist-pin upon this segment is so placed that the operation of the crank t upon the said segment is to turn it in one direction to one dead-center of the crank, and then in the other direction to the other dead-center of the crank, upon the shaft T, the wrist-pin upon the segment never passing the dead-center in either direction. Below this notched pinion R is a plate, R′, having a notch to correspond with the notch in the pinion. Below this plate is a pivoted blade, r, and below this a second similar plate, R''. The handle of the blade r projects beyond the plates, and stands in the path of two pins, r' r'', upon the cogged segment, which strike against said handle and move the knife-blade, causing it to shear off the wire to release the bundle after it is bound, as will be readily understood.

The operation of the binder is as follows: The grain is pushed up against the wire by the fork M. The upper arm at this moment brings down the bight of the wire, which, by means of the finger and nose of said arm, is inserted within the notch securely. The notched pinion now turns and twists the two ends of the wire securely together, and the knife cuts the wire loose, at the same time wedging the end of the wire unused between the blade and the plate to hold it for the next bundle. At this instant an elongation, l, of the crank L comes around and sweeps down any grain which may have lodged after the bundle has fallen, so as to keep the apparatus clear.

This mechanism will bind bundles of any size given it.

Having thus fully described the construction and operation of my invention, that which I deem new, and desire to secure by Letters Patent, is—

1. The combination of the loose arms G''', the rigid arms G, connections I' I'', rake-head H', and cam J, constructed, arranged, and operating substantially as and for the purposes specified.

2. The combination of the crank L upon shaft K''', the pitman L', fork-handle L'', fork M m, and pivoted connections L''' L$^{iv}$, substantially as and for the purpose specified.

3. The combination and arrangement of the arm N, finger p, tackle p', cord P, spring P', and arm N', and cam O, substantially as and for the purpose specified.

4. The combination of the cogged segment S, having two pins, r' r'', the notched pinion R, and pivoted blade r, substantially as specified.

5. The mechanism for producing an intermittent rotation, consisting of the flanged wheel V, having the teeth v', at which the flange is cut away, in combination with the flanged pinion U u, substantially as specified and shown.

6. The combination and arrangement of the shaft K''', actuated from the driving-shaft, the flanged wheel V v v', flanged pinion U u, shaft T, crank t, segment S, and notched pinion R, substantially as specified and shown.

JOHN F. APPLEBY.

Witnesses:
JOHN W. MUNDAY,
HEINR. F. BRUNS.